May 2, 1967 MASAAKI MORITA ETAL 3,317,574

METHOD OF MAKING FINELY DIVIDED FERROUS METAL SALTS OF ORGANIC ACIDS

Filed July 19, 1962

Inventors.
Masaaki Morita
Shigetaka Higuchi
Yuukou Kamata by Hill, Sherman, Meroni, Gross & Simpson Attys.

United States Patent Office 3,317,574

Patented May 2, 1967

3,317,574

METHOD OF MAKING FINELY DIVIDED FERROUS METAL SALTS OF ORGANIC ACIDS

Masaaki Morita, Kamakura-shi, Kanagawa-ken, and Shigetaka Higuchi and Yuukou Kamata, Miyagi-ken, Japan, assignors to Sony Corporation, Tokyo, Japan, a corporation of Japan Filed July 19, 1962, Ser. No. 211,067

Claims priority, application Japan, July 21, 1961, 36/26,147

3 Claims. (Cl. 260—439)

This invention relates to a method of making a fine powder, and more particularly to a method of making salts of organic acids and ferromagnetic metals of a controlled particle size from 0.1 to 2.0 microns in maximum length and of acicular, or columnar form.

In the case of the ferromagnetic metals, the organic acid salts of such metals, as well as co-precipitates of mixtures of two or more of such metal organic acid salts, can be converted to ferromagnetic powders suitable for use in the manufacture of magnetic impulse record members, more usually called magnetic tape. The conversion of the organic acid salts of the ferromagnetic metals into ferromagnetic powders can be accomplished by thermal decomposition to the oxides, followed by reduction to the magnetic form of the lower oxides of the metals, or by reduction and subsequent oxidation to the magnetic form of the higher oxides of the metals, or simply by reduction to the metal, itself, or mixture of metals, themselves. In all cases, the resulting ferromagnetic powder will be characteristically of a particle size between 0.1 to 2.0 microns, and preferably between 0.1 and 1 micron, in maximum length and of an acicular crystalline form. When made into magnetic tape in accordance with known methods, tapes having desired magnetic properties for various recording purposes can be obtained.

In general, the method of our invention comprises forming an ionized aqueous solution of a salt of the selected metal, or salts of the selected metals, and of an organic acid, or acids, and adding to such solution a sufficient quantity of an organic solvent to depress the extent of ionization of such salt, or salts, and effect a precipitation of the organic acid salt of the selected metal or metals. By the proper correlation of concentrations employed with the inorganic salts of the metals selected and with the organic acids and organic solvents used, a very fine powder of relatively uniform size between the limits above specified and of acicular crystalline particle form can be obtained.

It is therefore an important object of this invention to provide a novel method of making a finely divided powder of relatively uniform particle size between 0.1 and 2.0 microns in maximum length and of an acicular crystalline particle form.

Another object of this invention is to provide a method of preparing organic acid salts of ferromagnetic metals in the form of a powder having a particle size less than 2.0 microns in length and of acicular crystalline particle form, suitable as a source from which ferromagnetic powder for magnetic recording purposes can be readily prepared.

Figure 1:
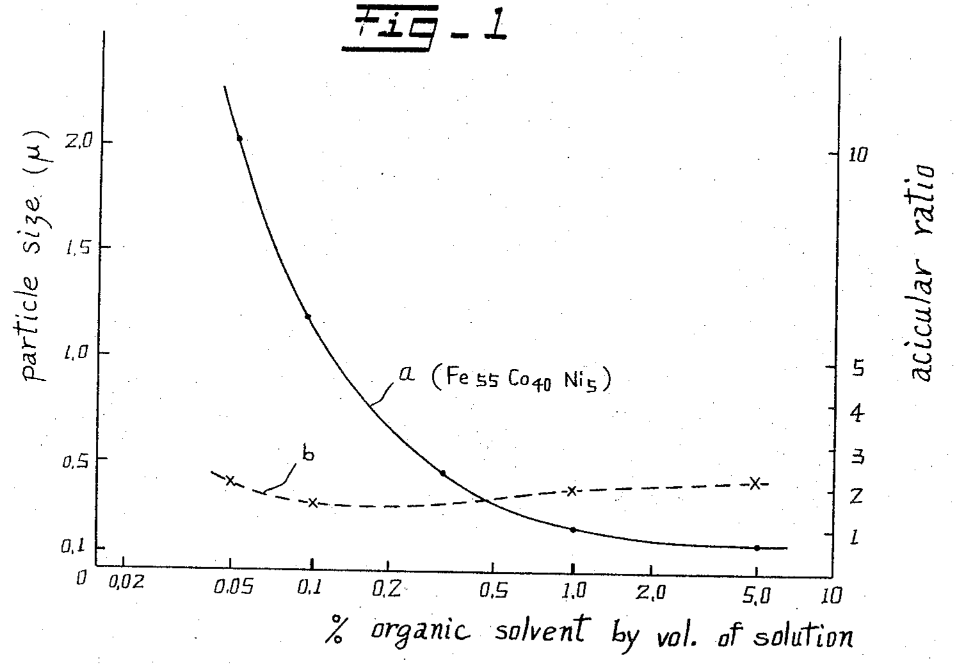
Figure 2:
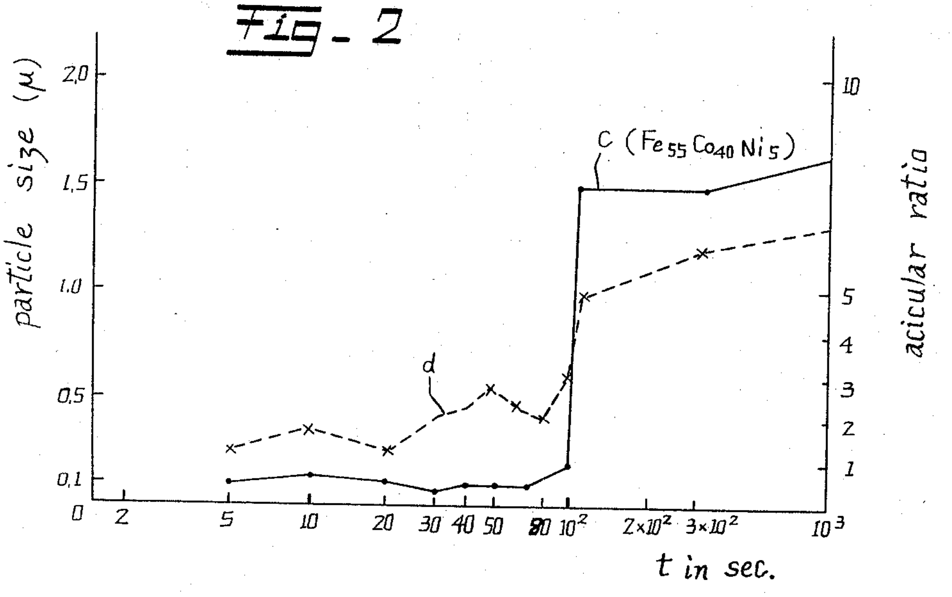

Other and further important objects and advantages of this invention will become apparent from the following description taken in conjunction with the accompanying drawing, in which:

FIGURE 1 is a graph illustrating the relation between the percent of organic solvent by volume of solution, the particle size in microns of the precipitate obtained and the acicular ratio of such particles. By "acicular ratio" is meant the ratio of maximum length to maximum transverse dimension characteristic of the particles obtained; and FIGURE 2 is a graph showing the relation between the particle size and the acicular ratio obtained, and the length of time, after the ionization system is initially formed, of incorporating an organic solvent into the aqueous solution of the salt.

In accordance with the principles of our invention, there is first formed an ionized aqueous solution of an inorganic salt of the metal, or metals, selected as the desired metal constituent, of the fine powder that is to be prepared. The preferred metals are the so-called ferromagnetic metals, iron, cobalt and nickel, or mixtures thereof, but others of the "heavy metals," as they are named in the periodic chart of the elements, can be used.

As a first step in our method, we prefer to make up an aqueous solution of salts formed by reaction between the selected metal and an inorganic acid. Any of the various inorganic salts of the desired metal, or metals, may be employed, so long as they have the desired water solubility and are highly ionized in aqueous solution form. Suitable examples are the chlorides, nitrates and sulphates of the metals, and in the cases of the ferromagnetic metals, the chlorides are more suitable.

In order to obtain the desired metal, or metals, in the final powder in a form suitable for conversion into a ferromagnetic powder, such as an oxide or a metal, a suitable organic acid is incorporated into the aqueous solution of the inorganic metal salts. Among the organic acids most suitable are those that have between one and four carbon atoms in the molecule, such as formic, acetic and oxalic acid. The acid selected may be either monocarboxylic or polycarboxylic, and may contain an OH group, as for instance in the case of lactic acid, but the simple, unsubstituted carboxylic acids are preferred.

In general, of course, the organic acid salts of the metals are less disassociated than are the inorganic acid salts of the corresponding metals. Consequently, upon the addition of an organic acid to the aqueous solution of the inorganic metal salts, the ionization of the solute present is correspondingly depressed. Under these conditions, provided the concentrations and proportions of the constituents are properly controlled, the precipitation of the organic acid salt of the selected metal can be readily effected, without the necessity of cooling or concentrating the solution, by the mere addition of a suitable organic solvent. Preferred solvents are alcohol, esters and ketones that are either completely water miscible or sufficiently soluble in water to function properly. Alcohols that have been found to be suitable are those containing from one to four carbon atoms in the molecule, such as methyl, ethyl, propyl and butyl alcohol. In the case of esters, those that have been found suitable contain from two to five carbon atoms in the molecule, and include methyl-, ethyl-, and propyl acetate. In the case of ketones, suitable ketones are those that contain from one to four carbon atoms in the molecule, such as acetone and methyl ethyl ketones. All of these organic solvents have at least an amount of solubility in water in excess of about 0.5 volume percent.

Incorporation of as little as 0.5 volume percent of a suitable organic solvent into the aqueous solution of an inorganic metal salt, in the presence of an equivalent reacting weight of an organic acid, is sufficient to effect an almost instantaneous precipitation of the organic acid salt of the metal present, with the precipitate of relatively uniform particle size between 0.1 and 1.0 microns in maximum length and of acicular particle form. In general, it is sufficient to add between 0.5 and 5.0 volume percent, and up to 10.0 volume percent of organic solvent to the aqueous solution of the metal salt, or salts. Except for economic reasons, much greater proportions of the organic solvents can be used to effect the practically instantaneous precipitation of the desired metal salt within the limits of size and shape desired, but beyond 10.0 volume percent is without further effect.

The following examples will serve to illustrate preferred methods of our invention, but it should be understood that these are merely by way of illustration and that our invention is not limited to these specific examples.

EXAMPLE I

An aqueous isopropyl alcohol solution, made by mixing equal weights of water and of isopropyl alcohol, is prepared for use as the organic solvent. Two separate solutions are then prepared: one being a 3% solution of a mixture of ferromagnetic metal chlorides in said 50/50 water-alcohol solution, the mixture consisting of iron chloride (55 mol percent), cobalt chloride (40 mol percent) and nickel chloride (5 mol percent); and a second solution consisting of a 3% solution of oxalic acid in the same 50/50 alcohol-water solution. Equal volumes of these two solutions are then mixed to provide a final solution, or ionized system, from which to effect precipitation. Almost instantaneously upon the formation of said final solution, particles of a co-precipitate of iron oxalate, cobalt oxalate and nickel oxalate, of a particle size between 0.1 and 0.3 microns, are obtained. The whole reaction is carried out at a normal temperature, in the neighborhood of 20 to 25° C., and the reaction resulting in the co-precipitation is carried out within 10 seconds or so after the provision of the final solution, or ionized system, and is complete in less than 100 seconds. Had no organic solvent been incorporated into the solution, the same amount of precipitation would have required from several minutes to half an hour, or so. It may thus be said that when the organic solvent is used to effect precipitation, the reaction is accomplished practically instantaneously. When examined under an electron microscope, the co-precipitate particles so produced characteristically have a particle size of between 0.1 and 0.3 microns.

EXAMPLE II

A 40% aqueous solution of a mixture of iron chloride (40 mol percent) and cobalt chloride (60 mol percent) is mixed with a 7% aqueous solution of oxalic acid in a volume ratio of 1 to 4.5 at normal temperatures. After the resulting solution has stood for 10 to 30 seconds, a 5% by volume addition is made of isopropyl alcohol (100%), and almost instantaneously a co-precipitation occurs of iron oxalate and cobalt oxalate, the characteristic particle size of which is between 0.8 and 1.0 microns and the characteristic crystalline particle shape of which is acicular or columnar.

Thus, in Example I, the organic solvent (alcohol) is initially present in the solution of the inorganic metal salt, and the organic acid, along with more of the organic solvent, is then introduced into the initial solution to effect the precipitation. In the case of Example II, however, the starting solution includes both the inorganic metal salt and the organic acid, the organic solvent is added thereto in order to initiate the precipitation of the organic salt of the metal. Where a more dilute solution of the inorganic metal salt is used, as in Example I, a higher proportion of organic solvent is required, in the neighborhood of 50% by weight, whereas with a more concentrated inorganic metal salt solution, as in Example II, a lower proportion of the organic solvent, in the neighborhood of 5% by volume can be used satisfactorily.

EXAMPLE III

A 40% aqueous solution of a mixture of iron chloride (55 mol percent), cobalt chloride (40 mol percent) and nickel chloride (5 mol percent), and a 20% aqueous solution of oxalic acid are mixed in the volume ratio of 1 to 2.3. After mixing, the mixture is held for 10 to 15 seconds at a temperature of about 40° C., and a 5% by volume addition of acetone (100%) is made to the initial or starting solution. Almost instantaneously co-precipitation occurs with the formation of co-precipitate particles of iron oxalate, cobalt oxalate and nickel oxalate. Such particles are characteristically of a particle size between 0.2 and 0.5 microns and of an acicular or columnar crystalline form.

Thus, in Example III, acetone is used instead of isopropyl alcohol, as employed for the organic solvent in Examples I and II, but nevertheless the powder ultimately obtained was of relatively uniform size and within the desired particle size limits.

In all of the above examples, the precipitate, or co-precipitate, can be recovered by filtration, decantation, centrifugal separation, or otherwise, and the recovered precipitate dried under suitable conditions to provide a powder in finely-divided, discrete particle form. Also, instead of using oxalic acid as the specific organic acid named in the examples given above, other organic acids having from one to four carbon atoms, inclusive, in the molecule can be used; instead of isopropyl alcohol as the organic solvent, other alcohols of from one to four carbon atoms can be used; or esters having from two to five carbon atoms can be used; and other ketones than acetone having from one to four carbon atoms in the molecule, can be used.

As illustrated by the solid line *a* in FIGURE 1, as little as 0.05 volume percent of an added suitable organic solvent will result in a particle size of about 2 microns. The particle size decreases as the volume percent of the organic solvent is increased, until at about 0.5 volume percent, the size of the particle is less than 0.5 microns, as shown on the left-hand ordinate. However, a further increase in the volume percent of organic solvent produces little further change in particle size, the size remaining at about 0.1 micron when the volume percent of organic solvent is increased to 2.0 percent and beyond.

The dotted line *b* of FIGURE 1 illustrates the relationship between maximum length and maximum transverse dimension that is characteristic of the particles obtained, namely the acicular ratio, which is shown on the right-hand ordinate of FIGURE 1. This ratio remains relatively constant at around 2 to 2½ to 1 regardless of the volume of percent of the organic solvent within the limits shown. When the ratio is 2 to 1 or greater, the particle may be said to be acicular.

The data used in preparing the curves in FIGURE 1 are based upon conditions similar to those of Example II except using isopropyl alcohol in place of acetone, in which an aqueous solution of a metallic salt (40 mol percent) and a 7% aqueous solution of oxalic acid are mixed and held for about 40 seconds, before adding the organic solvent represented by isopropyl alcohol, within the amounts indicated as volume percent along the abscissa in FIGURE 1.

In FIGURE 2, the left-hand ordinate represents the particle size in microns ($\mu$), while the right-hand ordinate represents the acicular ratio, and the abscissa is on a logarithmic scale in time ($t$) in seconds (sec.), starting with the time of forming the final solution, or ionization system. The solid curve *c* represents the particle size in microns, as measured on the left-hand ordinate, and the dotted line *d* represents the acicular ratio, as measured on the right-hand ordinate.

FIGURE 2 assumes an ionization system in which isopropyl alcohol is added as the organic solvent in an amount equal to 5.0 volume percent of the total solution. If the addition of the isopropyl alcohol is withheld until 100 seconds having elapsed since the initiation of the ionization system, namely, since the time of mixing the inorganic acid salts and the organic acid, an appreciable change is observed in the particle size of the powders obtained. For example, at 100 seconds ($10^2$ sec.), the particle size, as shown by the solid line *c*, indicates a particle size of about 1.5 microns. This result means that if one waits until 100 seconds after the beginning of the ionization system before adding the organic solvent, such addition of the organic solvent is ineffective to produce a particle size within the preferred range of from 0.1 to 1.0 microns maximum length, but is effective to produce a particle size that is still within the broader range of 0.1 to 2.0 microns. Accordingly, if the more preferred range is desired, the organic solvent must be added promptly following the initiation of the ionization system, that is, within less than 100 seconds after the mixing of the solution of the inorganic metal salts and the organic acid solution.

The portion of the solid line *c* to the left of *t* equals $10^2$, represents the conditions that obtain when the organic solvent is added within five, ten, twenty, etc., seconds after the initiation of the ionization system. The same is true with regard to that portion of the dotted line *d* to the left of $t=10^2$ sec.

It will be understood that modifications and variations may be effected without departing from the scope of the novel concepts of the present invention.

We claim as our invention:

1. A method of making a finely divided salt of an organic acid and a ferromagnetic metal, which comprises:
   (1) forming an aqueous solution of an inorganic salt of a ferromagnetic metal selected from the group consisting of iron, cobalt and nickel, in the presence of an organic carboxylic acid selected from the group consisting of unsubstituted carboxylic acids having from 1 to 4 carbon atoms in the molecule,
   (2) incorporating into said solution within not more than 100 seconds after the formation thereof at least 0.05% by volume of an organic solvent selected from the group consisting of water soluble alcohols and ketones each having from 1 to 4 carbon atoms and water soluble esters having from 2 to 5 carbon atoms in the molecule to effect precipitation of a salt of the selected metal and the selected organic acids, and
   (3) recovering said precipitated salt, said recovered salt having a particle size between 0.1 and 2.0 microns in length.

2. The method as defined by claim 1, wherein: the ferromagnetic metal is iron, the organic acid is oxalic and the organic solvent is isopropyl alcohol.

3. The method as defined by claim 2, wherein: at least 0.5% by volume of the selected solvent is incorporated into said solution within not more than 60 seconds after the formation thereof, and the recovered salt has a particle size between 0.1 and 1.0 microns in length.

References Cited by the Examiner

UNITED STATES PATENTS

| | | | |
|---|---|---|---|
| 1,637,281 | 7/1927 | Schatz | 260—439 |
| 2,636,892 | 4/1953 | Mayer | 260—439 |
| 3,019,189 | 1/1962 | Albers-Schoenberg | 252—62.5 |

FOREIGN PATENTS

| | | |
|---|---|---|
| 765,464 | 1/1957 | Great Britain. |

TOBIAS E. LEVOW, *Primary Examiner.*

MAURICE A. BRINDISI, *Examiner.*

S. R. BRESCH, E. C. BARTLETT, A. P. DEMERS, *Assistant Examiners.*